United States Patent
Ji et al.

(10) Patent No.: US 11,770,285 B2
(45) Date of Patent: Sep. 26, 2023

(54) METHOD AND DEVICE FOR TRANSMITTING DATA IN WIRELESS COMMUNICATION SYSTEM

(71) Applicant: Samsung Electronics Co., Ltd., Suwon-si (KR)

(72) Inventors: Hyoungju Ji, Suwon-si (KR); Juho Lee, Suwon-si (KR); Younsun Kim, Suwon-si (KR); Hoondong Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/775,734

(22) PCT Filed: Nov. 2, 2020

(86) PCT No.: PCT/KR2020/015150
§ 371 (c)(1),
(2) Date: May 10, 2022

(87) PCT Pub. No.: WO2021/096135
PCT Pub. Date: May 20, 2021

(65) Prior Publication Data
US 2022/0393927 A1    Dec. 8, 2022

(30) Foreign Application Priority Data

Nov. 11, 2019  (KR) .......................... 10-2019-0143848

(51) Int. Cl.
*H04L 27/26*    (2006.01)
*H04L 27/00*    (2006.01)
(Continued)

(52) U.S. Cl.
CPC ........ *H04L 27/2636* (2013.01); *H04L 1/0023* (2013.01); *H04L 27/206* (2013.01); *H04L 27/3411* (2013.01); *H04L 27/3483* (2013.01)

(58) Field of Classification Search
CPC . H04L 27/2636; H04L 1/0023; H04L 27/206; H04L 27/3411; H04L 27/3483;
(Continued)

(56) References Cited

U.S. PATENT DOCUMENTS

| 10,103,921 B2 | 10/2018 | Jungnickel et al. |
| 2015/0280945 A1 | 10/2015 | Tan et al. |
| 2019/0149381 A1* | 5/2019 | Vos ..................... H04L 27/3444 370/329 |

FOREIGN PATENT DOCUMENTS

| EP | 3537678 A1 * | 9/2019 | ......... H04L 27/2605 |
| KR | 10-2016-0048933 A | 5/2016 | |

(Continued)

OTHER PUBLICATIONS

Huawei et al., Discussion on DMRS sequence design for low Papr, R1-1900020, 3GPP TSG RAN WG1 Ad-Hoc Mleeting 1901, Taipei, Jan. 12, 2019, pp. 1-12.
(Continued)

*Primary Examiner* — Tanmay K Shah
(74) *Attorney, Agent, or Firm* — Jefferson IP Law, LLP

(57) ABSTRACT

Provided are a method and apparatus for transmitting data in a wireless communication system. The method, performed by a transmission apparatus, of transmitting data includes performing π/2-binary phase shift keying (BPSK) modulation on M symbols, performing a discrete Fourier transform (DFT) on the M symbols on which the π/2-BPSK modulation has been performed, performing an inverse fast Fourier transform (IFFT) on M/2 symbols among the M symbols on which the DFT has been performed, and transmitting, to a reception apparatus, the M/2 symbols on which the IFFT has
(Continued)

been performed, wherein a constellation of the M symbols on which the π/2-BPSK modulation has been performed may have only real components or imaginary components.

15 Claims, 12 Drawing Sheets

(51) Int. Cl.
*H04L 1/00* (2006.01)
*H04L 27/20* (2006.01)
*H04L 27/34* (2006.01)

(58) Field of Classification Search
CPC ............... H04L 1/0003; H04L 27/2032; H04L 27/2053; H04W 72/23
USPC ........................................................ 375/262
See application file for complete search history.

(56) References Cited

FOREIGN PATENT DOCUMENTS

| KR | 10-2021-0037466 A | 4/2021 |
| KR | 10-2021-0040703 A | 4/2021 |
| WO | 2018/130973 A1 | 7/2018 |
| WO | 2019/095057 A1 | 5/2019 |
| WO | 2019/099957 A1 | 5/2019 |

OTHER PUBLICATIONS

Iith et al., pi/2 BPSK with precoding/post-DFT subcarrier spectrum shaping, R1-1704782, 3GPP TSG RAN WG1 Meeting#88bis, Mar. 22, 2017, Spokane, USA.
Loulou Alaaeddin et al., Multiplierless Filtered-OFDM Transmitter for Narrowband IoT Devices, IEEE Internet of Things Journal, IEEE, USA, vol. 7, No. 2, pp. 846-862, Feb. 11, 2020.
European Search Report dated Oct. 17, 2022, issued in European Application No. 20887404.0.

\* cited by examiner

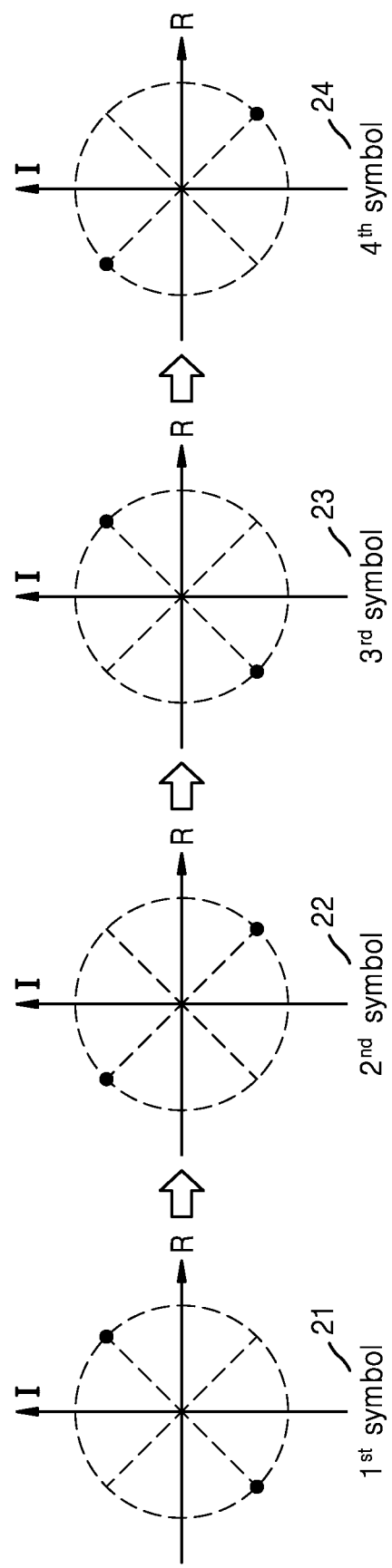

METHOD AND DEVICE FOR TRANSMITTING DATA IN WIRELESS COMMUNICATION SYSTEM

TECHNICAL FIELD

The disclosure relates to a method and apparatus for transmitting data in a wireless communication system. More particularly, the disclosure relates to a transmission and reception method for modulation and mapping of symbols in an orthogonal frequency division multiplexing (OFDM) system.

BACKGROUND ART

In order to meet the increasing demand with respect to wireless data traffic after the commercialization of $4^{th}$ generation (4G) communication systems, efforts have been made to develop enhanced $5^{th}$ generation (5G) communication systems or pre-5G communication systems. For this reason, 5G communication systems or pre-5G communication systems are called as beyond 4G network communication systems or post long-term evolution (LTE) systems. The 5G communication system defined by the third-generation partnership project (3GPP) is called a new radio (NR) system. In order to achieve a high data rate, consideration is given to implementing 5G communication systems in ultra-high frequency (millimeter-wave (mmWave)) bands (e.g., 60 GHz bands). To reduce path loss of radio waves and increase transmission distances of radio waves in an ultra-high frequency band, technologies for 5G communication systems, such as beamforming, massive multi-input multi-output (MIMO), full dimensional MIMO (FD-MIMO), array antenna, analog beamforming, and large-scale antenna system are being discussed and applied to NR systems. Also, in order to improve networks of systems, for 5G communication systems, development of technologies such as evolved small cells, advanced small cells, cloud radio access networks (cloud RANs), ultra-dense networks, device-to-device (D2D) communication, wireless backhaul, moving networks, cooperative communication, coordinated multi-points (CoMP), and interference cancellation is underway. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-centered connection network, through which humans generate and consume information, to an Internet of things (IoT) network where distributed components such as objects exchange information with each other and process the information. Internet of everything (IoE) technology in which a big data processing technology through a connection with a cloud server or the like is combined with the IoT technology has emerged. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In an IoT environment, intelligent Internet technology (IT) services may be provided to collect and analyze data obtained from objects connected to each other to create new value in human life. The IoT may be applied to fields such as smart homes, smart buildings, smart cities, smart cars or connected cars, smart grids, health care, smart home appliances, and advanced medical services through convergence and integration of existing IT and various industries.

In this regard, various attempts to apply the 5G communication system to the IoT network are being made. For example, technologies such as sensor network, M2M communication, and MTC are implemented by 5G communication technologies such as beamforming, MIMO, and array antenna. The application of a cloud RAN as big data processing technology may also be considered as an example of convergence between 5G technology and IoT technology.

DESCRIPTION OF EMBODIMENTS

Technical Problem

The disclosure proposes, in order to enhance transmission coverage, a method by which M symbols are modulated using a π/2-binary phase shift keying (BPSK) modulation scheme in which real and imaginary constellation points are shifted for each symbol, preprocessing is performed on the M symbols according to an M-size discrete Fourier transform (DFT), and only M/2 symbols among the M symbols are transmitted.

Solution to Problem

According to an embodiment of the disclosure, a method, performed by a transmission apparatus, of transmitting data in a wireless communication system includes performing π/2-binary phase shift keying (BPSK) modulation on M symbols, performing a discrete Fourier transform (DFT) on the M symbols on which the π/2-BPSK modulation has been performed, performing an inverse fast Fourier transform (IFFT) on M/2 symbols among the M symbols on which the DFT has been performed, and transmitting, to a reception apparatus, the M/2 symbols on which the IFFT has been performed, wherein a constellation of the M symbols on which the π/2-BPSK modulation has been performed may have only real components or imaginary components.

According to an embodiment of the disclosure, a method, performed by a reception apparatus, in a wireless communication system includes receiving M/2 symbols from a transmission apparatus, performing a fast Fourier transform (FFT) on the M/2 symbols, and performing an inverse discrete Fourier transform (IDFT) on M symbols, the M symbols comprising the M/2 symbols on which the FFT has been performed, and M/2 symbols obtained by copying the M/2 symbols on which the FFT has been performed, wherein the M/2 symbols received from the transmission apparatus may be symbols on which π/2-binary phase shift keying (BPSK) modulation has been performed by the transmission apparatus, and a constellation of the M/2 symbols on which the FFT has been performed may have only real components or imaginary components according to the π/2-BPSK modulation.

BRIEF DESCRIPTION OF THE DRAWINGS

FIG. 2 is a diagram of constellation points of symbols transmitted during π/2-BPSK modulation, according to an embodiment of the disclosure.

MODE OF DISCLOSURE

Figure 1:
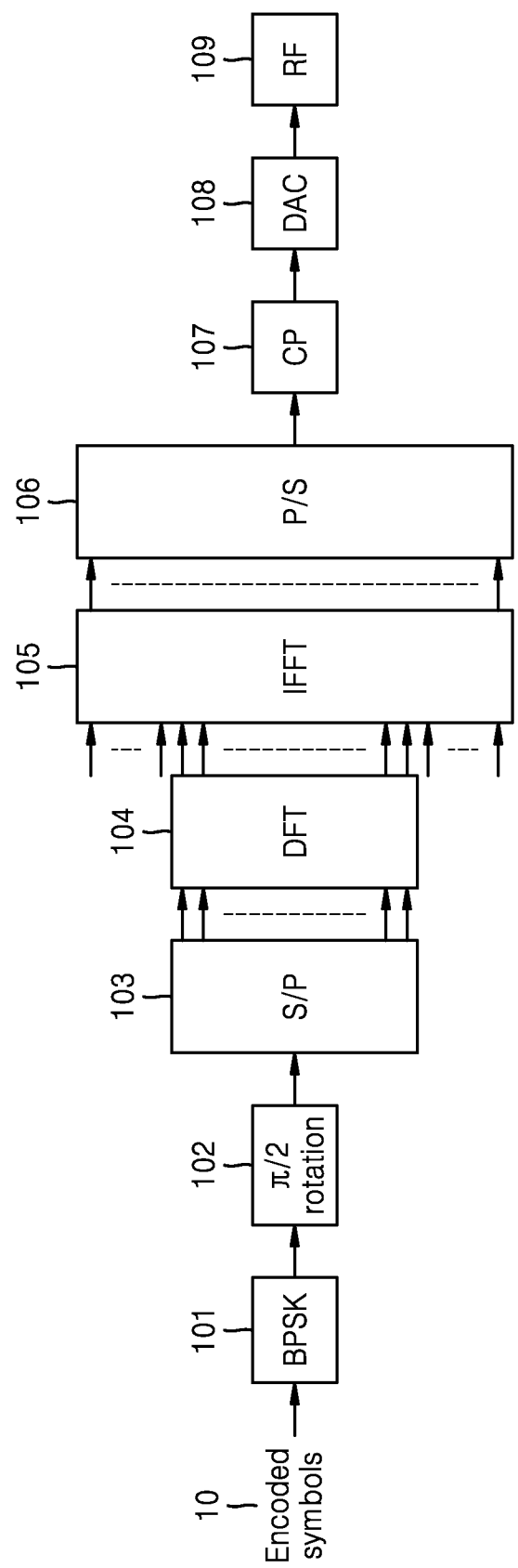
FIG. 1 is a diagram illustrating a method by which a transmission apparatus performs π/2-binary phase shift keying (BPSK) modulation on symbols and transmits the modulated symbols, according to an embodiment of the disclosure.

Hereinafter, embodiments will be described in detail with reference to the accompanying drawings.

In the following descriptions of embodiments, descriptions of techniques that are well known in the art and are not directly related to the disclosure are omitted. This is intended to prevent the unnecessary descriptions from obscuring the subject matters of the disclosure and to further clearly describe the gist of the disclosure.

For the same reasons, components may be exaggerated, omitted, or schematically shown in drawings for clarity. Also, the size of each component does not entirely reflect the actual size. In each drawing, components that are the same or are in correspondence are rendered the same reference numeral.

The advantages and features of the disclosure and methods of achieving them will become apparent with reference to embodiments of the disclosure described in detail below with reference to the accompanying drawings. The disclosure may, however, be embodied in many different forms and should not be construed as being limited to the embodiments set forth herein; rather, these embodiments are provided so that the disclosure will be thorough and complete, and will fully convey the concept of the disclosure to those of ordinary skill in the art. The scope of the disclosure is only defined in the claims. In the specification, the same components are denoted by the same reference numerals.

In this regard, it will be understood that combinations of blocks in flowcharts or process flow diagrams may be performed by computer program instructions. Because these computer program instructions may be loaded into a processor of a general-purpose computer, a special purpose computer, or other programmable data processing equipment, the instructions, which are executed through the processor of the computer or other programmable data processing equipment, generate means for implementing functions specified in the flowchart block(s). Because these computer program instructions may also be stored in a computer-executable or computer-readable memory that may direct a computer or other programmable data processing equipment to function in a particular manner, the instructions stored in the computer-executable or computer-readable memory may produce an article of manufacture including instruction means that implement the functions specified in the flowchart block(s). Because the computer program instructions may also be loaded onto a computer or other programmable data processing equipment, a series of operational steps may be performed on the computer or other programmable equipment to produce a computer implemented process, and thus the instructions executed on the computer or other programmable equipment may provide steps for implementing the functions specified in the flowchart block(s).

In addition, each block of the flowchart illustrations may represent a module, segment, or portion of code, which includes one or more executable instructions for implementing specified logical function(s). It should also be noted that in some alternative implementations, the functions noted in the blocks may occur out of the order. For example, two blocks shown successively may actually be executed substantially concurrently, or the blocks may sometimes be performed in a reverse order according to the corresponding function.

The term ' . . . er/or' or 'module' as used herein refers to a software or hardware component, such as field programmable gate array (FPGA) or application specific integrated circuit (ASIC), which performs some functions. However, the term ' . . . er/or' or 'module' is not limited to software or hardware. The term ' . . . er/or' or 'module' may be configured in an addressable storage medium or may be configured to reproduce one or more processors. Thus, for example, the term ' . . . ers/ors' or 'modules' may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. The functionality provided in components and ' . . . ers/ors' or 'modules' may be combined into fewer components and ' . . . ers/ors' or 'modules' may be further separated into additional components and ' . . . ers/ors' or 'modules'. Further, the components and ' . . . ers/ors' or 'modules' may be implemented to operate one or more central processing units (CPUs) in a device or a secure multimedia card. Also, according to an embodiment, a '. . . er/or' or 'module' may include one or more processors.

FIG. 1 is a diagram of a method by which a transmission apparatus performs π/2-bindary phase shift keying (BPSK) modulation on symbols and transmits the modulated symbols, according to an embodiment of the disclosure.

Referring to FIG. 1, symbols 10 encoded as a result of channel coding may be BPSK-modulated (101). Then, a constellation of the BPSK-modulated symbols may be rotated by π/2 (102). In a π/2 rotation process, a rotation angle increases by a multiple of π/2 for each symbol. For example, referring to FIG. 2, the rotation angle may increase by the multiple of π/2 for each symbol. For example, a first symbol 21 is at 0° for, a second symbol 22 is at 90°, a third symbol 23 is at 180°, and a fourth symbol 24 is at 270°.

Rotated symbols may be arranged as M symbols through a serial-to-parallel (S/P) apparatus 103 and input to a discrete Fourier transform (DFT) preprocessor 104, and M symbols may be generated through the DFT preprocessor 104 and then output. The M generated symbols may be mapped to M positions of an inverse fast Fourier transform (IFFT) 105, to be transmitted in a desired frequency domain. The mapped symbols may be transformed into time symbols through the IFFT 105 and may be transformed into orthogonal frequency division multiplexing (OFDM) symbols through a parallel-to-serial (P/S) apparatus 106. Then, cyclic prefixes (CPs) may be concatenated (107) to OFDM symbols, and the CP-concatenated OFDM symbols may be transformed into analog signals through a digital-to-analog converter (DAC) 108. The analog signals may be transmitted to a radio frequency (RF) module and transmitted through an antenna.

Constellation points used may be different depending on symbols transmitted during π/2-BPSK modulation according to the embodiment of FIG. 1, and a movement distance during shifting between a constellation point of a previous symbol and a constellation point of a subsequent symbol may be minimized. Also, a case where the origin (zero point (0,0)) is crossed during shifting between constellation points does not occur. In the above manner, a peak-to-average-power-ratio (PAPR) may be reduced, and thus, higher transmission power may be used when a power amplifier has poor linearity or low efficiency, such that coverage may be enhanced.

Figure 3A:
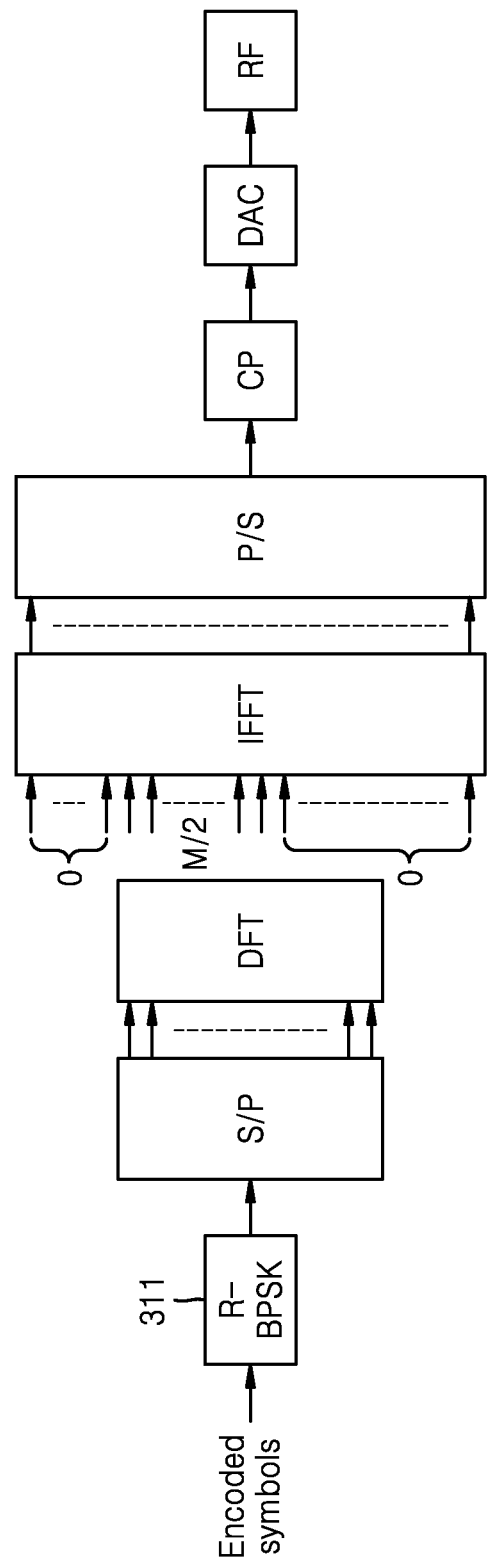
FIG. 3A is a diagram illustrating a method by which a transmission apparatus modulates symbols by using a first transmission scheme to enhance coverage, and transmits the modulated symbols, according to an embodiment of the disclosure.
Figure 3B:
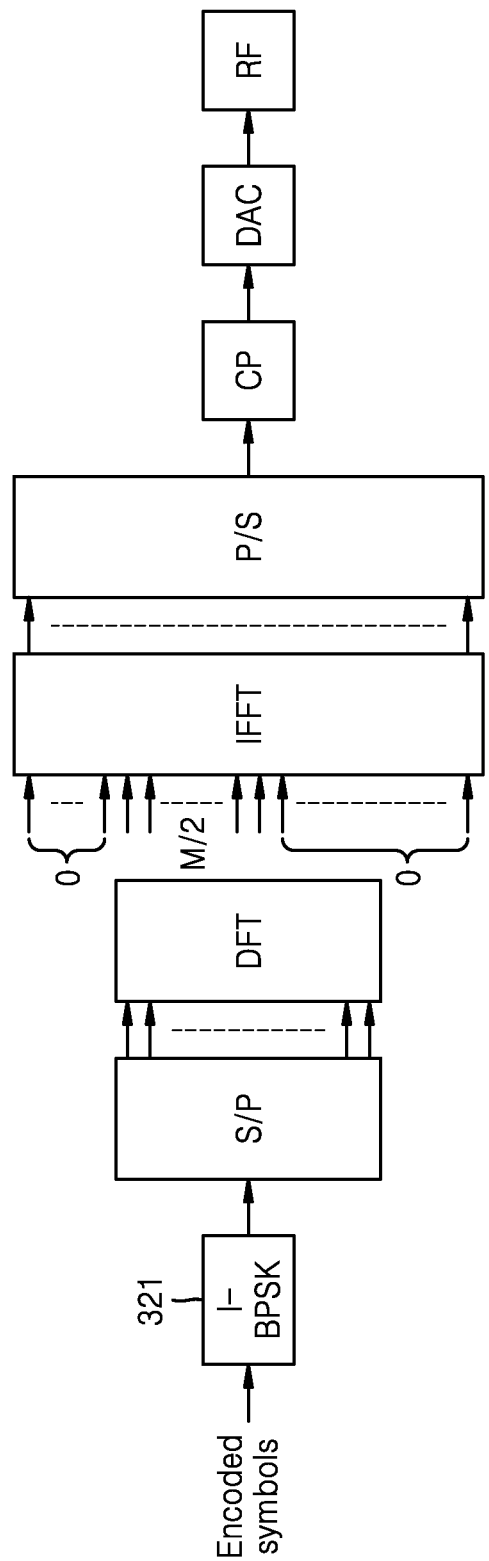
FIG. 3B is a diagram illustrating a method by which a transmission apparatus modulates symbols by using a second transmission scheme to enhance coverage, and transmits the modulated symbols, according to an embodiment of the disclosure.
Figure 3C:
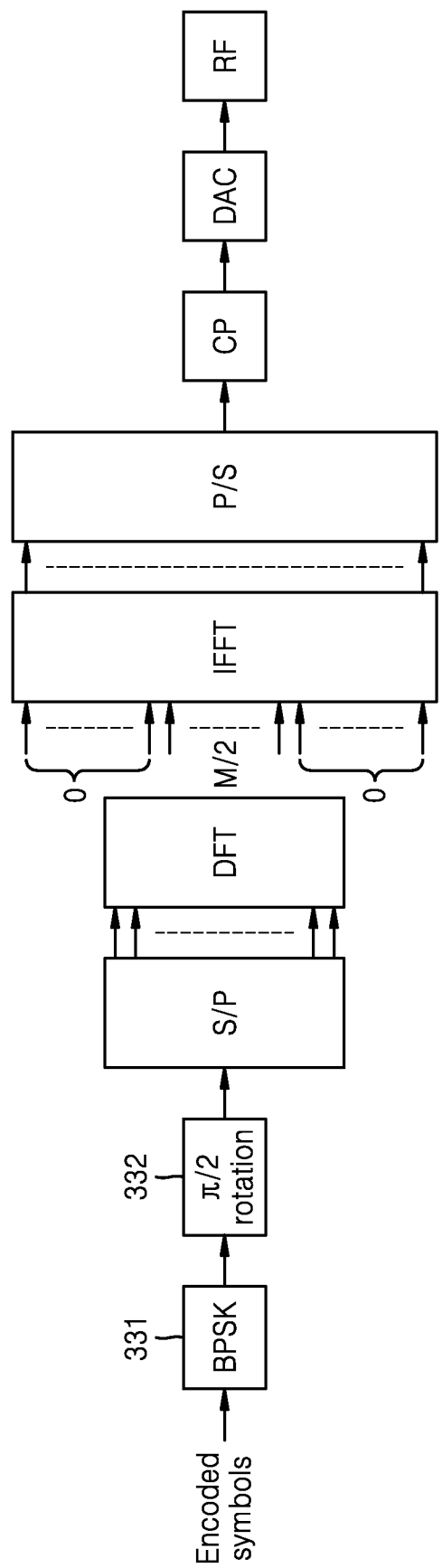
FIG. 3C is a diagram illustrating a method by which a transmission apparatus modulates symbols by using a third transmission scheme to enhance coverage, and transmits the modulated symbols, according to an embodiment of the disclosure.

FIGS. 3A to 3C are diagrams of a method by which the transmission apparatus modulates symbols by using first to third modulation schemes to enhance coverage, and transmits the modulated symbol, according to embodiments of the disclosure.

Techniques proposed in FIGS. 3A to 3C are modulation schemes (the first to third modulation schemes) for further enhancing coverage than the π/2 BPSK modulation scheme of the related art. The transmission apparatus according to the embodiments of FIGS. 3A to 3C may be a terminal or a base station but is not limited thereto.

FIGS. 3A and 3B illustrate a method of modulating symbols by using a modulation scheme 311 (hereinafter, referred to as the first modulation scheme) using only real points or a modulation scheme 321 (hereinafter, referred to as the second modulation scheme) using only imaginary points, among constellation points used in the BPSK modulation scheme, and transmitting the modulated symbols. When DFT preprocessing is performed by using, as input, symbols modulated by using the modulation schemes in FIGS. 3A and 3B, outputs (M output symbols) of the DFT preprocessing are in a symmetric form, and at least two symbols having the same information are included in the M output symbols.

Accordingly, there is no need to transmit all the M output symbols, and only M/2 symbols among the M output symbols may be mapped to frequency positions of the IFFT and remaining M/2 symbols may not be mapped. Transmission power for transmitting M symbols may be used to transmit (half transmission) M/2 symbols (i.e., mapped M/2 symbols) on which data is actually transmitted, and the M/2 symbols on which data is transmitted may be transmitted by boosting the transmission power. Accordingly, transmission signal power for each symbol may increase by twice, and coverage may be enhanced.

FIG. 3C illustrates a method of increasing transmission power of a transmission symbol by using a π/2-BPSK modulation scheme, according to an embodiment of the disclosure. Hereinafter, the π/2-BPSK modulation scheme described with reference to FIG. 3C is referred to as the third modulation scheme.

As described above, by using the π/2-BPSK modulation scheme, the PAPR reduction described above may be achieved. Referring to FIG. 3C, M symbols encoded as a result of channel coding may be BPSK-modulated (331), and the BPSK-modulated symbols may be rotated by π/2 (332) for each symbol. In this case, the BPSK modulation scheme according to the embodiment of FIG. 3C may be a scheme of mapping encoded symbols to only one of an imaginary axis or a real axis of a constellation, and constellation points of the BPSK-modulated symbols may have only imaginary components or real components. Also, a constellation of the BPSK-modulated symbols may be rotated by π/2, and a rotation angle may increase by a multiple of π/2.

Figure 4:
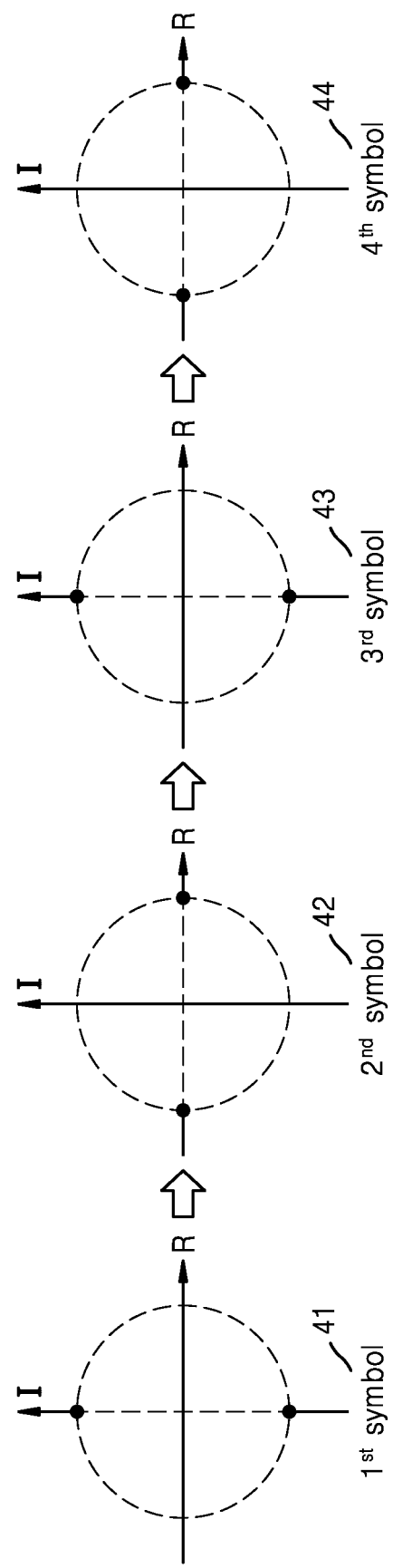
FIG. 4 is a diagram of constellation points of symbols transmitted during modulation using a third modulation scheme, according to an embodiment of the disclosure.

For example, referring to FIG. 4, among the BPSK-modulated symbols, a constellation used by a first symbol 41 may be rotated by 0°, a constellation used by a second symbol 42 may be rotated by 90°, a constellation used by a third symbol 43 may be rotated by 180°, and a constellation used by a fourth symbol 44 may be rotated by 270°. Therefore, according to the embodiment of FIG. 3C, constellation points of the BPSK-modulated symbols may have only imaginary components or real components, and even though the constellation of the BPSK-modulated symbols is rotated by π/2, constellation points after rotation may have only imaginary components or real components.

The rotated symbols may be arranged as M symbols through the S/P apparatus and input to the DFT preprocessor, or M symbols may be generated through the DTF preprocessor and then output. When DFT preprocessing is performed by using, as input, symbols modulated by using the modulation scheme in FIG. 3C, outputs (M output symbols) of the DFT preprocessing are in a symmetric form, and at least two symbols having the same information are included in the M output symbols.

Accordingly, there is no need to transmit all the symbols having the same information, only M/2 symbols among the DFT-preprocessed M symbols may be transmitted. For example, among the DFT-preprocessed M symbols, only M/2 symbols corresponding to symbols from an M/4-th symbol to a (3M/4−1)-th symbol may be transmitted.

Referring to FIG. 4, constellation points used may be different according to symbols transmitted during π/2-BPSK modulation according to the embodiment of FIG. 3C, and a movement distance between a constellation point of a previous symbol and a constellation point of a subsequent symbol may be minimized. Also, a case where the zero point (0,0) is crossed during shifting between constellation points does not occur. In the above manner, a PAPR may be lowered as in the related art, and thus, higher transmission power may be used when a power amplifier has poor linearity or low efficiency, such that coverage may be enhanced.

Also, as in the embodiments of FIGS. 3A and 3B described above, because the number of transmitted symbols is reduced by half, transmission signal power for each transmission symbol increases by twice, and accordingly, an additional transmission power gain of 3 dB (3 dB power boosting) may be obtained. Thus, by using the π/2-BPSK modulation scheme according to the embodiment of FIG. 3C and reducing the number of transmitted symbols by half, the same information may be transmitted farther than in the related art (i.e., coverage may be enhanced).

Figure 5:
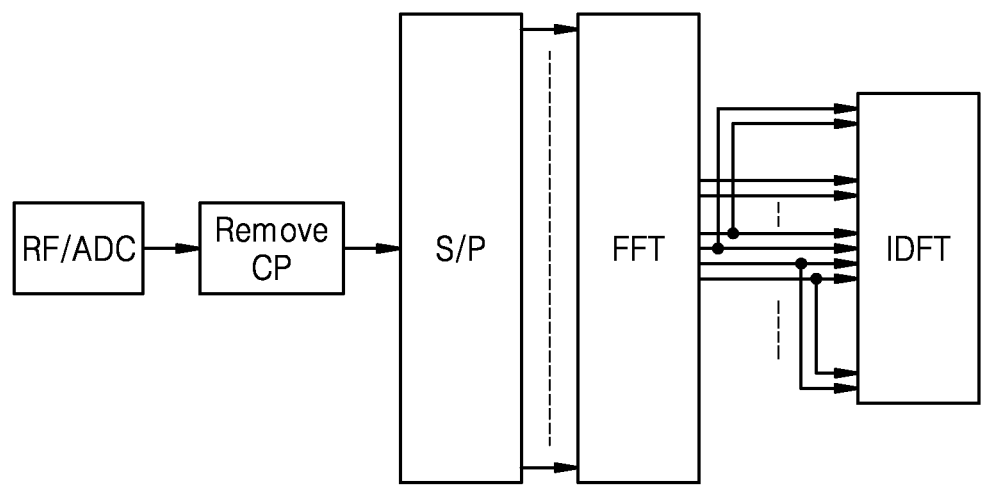
FIG. 5 is a diagram illustrating a method by which a reception apparatus receives symbols transmitted by the transmission apparatus in FIGS. 3A to 3C, according to an embodiment of the disclosure.

FIG. 5 is a diagram of a method by which a reception apparatus receives symbols transmitted by the transmission apparatus in FIGS. 3A to 3C, according to an embodiment of the disclosure. The reception apparatus according to the embodiment of FIG. 5 may be the terminal or the base station but is not limited thereto.

Referring to FIG. 5, the reception apparatus may receive the M/2 symbols transmitted by the transmission apparatus in FIGS. 3A to 3C. The reception apparatus may need to reconstruct M symbols again by using the received M/2 symbols.

Hereinafter, it will be described under the assumption that the transmission apparatus of FIG. 3C transmitted only the M/2 symbols corresponding to the symbols from the M/4-th symbol to the (3M/4−1)-th symbol among the DFT-preprocessed M symbols, and the reception apparatus received the M/2 symbols. The reception apparatus may copy each of M/2 symbols output through a fast Fourier transform (FFT) one by one and may input the existing M/2 symbols and the copied M/2 symbols to an inverse discrete Fourier transform (IDFT). For example, the reception apparatus may input M/2 symbols output through the FFT, to the symbols corresponding to the symbols from the M/4-th symbol to the (3M/4−1)-th symbol among symbols input to the IDFT. Also, the reception apparatus may copy symbols corresponding to symbols from an M/4-th symbol to a (M/2−1)-th symbol among the M/2 symbols output through the FFT, and may sequentially input the copied symbols to symbols from a 0th symbol to a (M/4−1)-th symbol among the symbols input to the IDFT (i.e., among the M/2 symbols output through the FFT, a (M/2−1)-th symbol may be input as a 0th symbol and a (M/2−2)-th symbol may be input as a first symbol). Similarly, the reception apparatus may copy symbols corresponding to symbols from an M/2-th symbol to a (3M/4−1)-th symbol among the M/2 symbols output through the FFT, and may sequentially input the copied symbols to symbols from a (M−1)-th symbol to a 3M/4-th symbol among the symbols input to the IDFT (i.e., among the M/2 symbols output through the FFT, an M/2-th symbol may be input as a (M−1)-th symbol and a (M/2+1)-th symbol may be input as a (M−2)-th symbol). When input to the IDFT is configured as described above, the existing DFT-output symbols of the transmission apparatus may be all reconstructed. Accordingly, even though the transmission apparatus transmits only M/2 symbols, the same effect as if M symbols are transmitted may be obtained.

First Embodiment: In a Case where Only M/2 Symbols are Transmitted while Scheduling M Modulated Symbols Hereinafter, operations of the base station and the terminal, according to the first embodiment of the disclosure, when transmission of the M modulated symbols is scheduled and only the M/2 symbols are transmitted will be described. The first embodiment of the disclosure may relate to a method of transmitting half of scheduled symbols to transmit symbols with higher transmission power when the modulation scheme (i.e., the first modulation scheme, the second modulation scheme, or the third modulation scheme) proposed in FIGS. 3A to 3C is applied. Hereinafter, the first embodiment will be described by using the method of transmitting half of the scheduled symbols when the third modulation scheme is applied as an example, but the first embodiment may be equally applied even when the first modulation scheme and the second modulation scheme are applied.

Next, when the transmission apparatus (base station or terminal) transmits M-size packets, a method by which the base station provides the terminal with information for transmitting only M/2 packets is proposed. In the disclosure, a packet size may refer to a transport block size or a code block size. A detailed method proposed is as follows.

1. Method of adding an indicator to downlink control information (DCI): in this method, the base station adds information about the method (e.g., the third modulation scheme+transmission of M/2 symbols) proposed in the disclosure to a bit field or a bit codepoint of DCI and transmits the same to the terminal. A field or a bit codepoint added to the DCI may be interpreted as shown in the following table.

TABLE 1

| Bit field | Interpretation |
| --- | --- |
| 0 | Disabled or not used or constellation point set #1 |
| 1 | Enabled or used or constellation point set #2 |

If the bit field is 0, the bit field may be interpreted as if M symbols are transmitted on M allocated resources (e.g., resource elements) when the third modulation scheme (the π/2-BPSK modulation scheme using only real or imaginary constellation points) is disabled and symbols are transmitted by using the π/2-BPSK modulation scheme of the related art. If the bit field is 1, it may be interpreted as if the third modulation scheme is enabled and π/2-BPSK-modulated M/2 symbols in a different scheme from the π/2-BPSK modulation scheme of the related art are mapped to and transmitted on M/2 resources among the M allocated resources. In a method of transmitting symbols on the M/2 resources among the M allocated resources, the symbol may be transmitted by using first M/2 resources, using last M/2 resources, or using M/2 resources in the middle, among allocation positions of M resources indicated by resource allocation. Positions of M/2 resources on which symbols are transmitted among the M allocated resources may be positions determined by high-layer signaling or may be specific positions fixed as described above.

Also, the base station may include, in the DCI, a bit field indicating the positions of the M/2 resources on which symbols are transmitted, in addition to allocation of the M resources, and may transmit the DCI to the terminal. For example, by adding 1 bit indicating the positions of the M/2 resources on which symbols are to be transmitted to the DCI, whether the resources on which symbols are to be transmitted are the first M/2 resources (when indicated by 0) or the last M/2 resources (when indicated by 1), among the M allocated resources may be indicated. In another method, a bit field added to the DCI may indicate whether the resources on which symbols are to be transmitted are the first M/2 resources or the last M/2 resources (when indicated by 0) or the M/2 resources in the middle (when indicated by 1), among the M allocated resources. If 2 bits are used for the bit field added to the DCI, the bit field may indicate whether the resources on which symbols are to be transmitted are the first M/2 resources (indicated by 00), the last M/2 resources (indicated by 01), or the M/2 resources in the middle (indicated by 10), among the M allocated resources, or whether comb transmission is used (indicated by 11).

2. Method of linking to a modulation and coding scheme (MCS) codepoint of DCI: in this method, the base station indicates transmission (or reception) of symbols using the method (e.g., the third modulation scheme+transmission of M/2 symbols) proposed in the disclosure, by using a specific codepoint among 5 bits indicating an MCS of DCI fields. This method may largely include two methods. In one method, when 5 bits indicating an MCS of DCI fields uses a pre-configured MCS using $\pi/2$-BPSK, in a case where a value indicated by the DCI indicates an MCS field using the corresponding $\pi/2$-BPSK, the proposed method is used for transmission. In the other method, in an MCS field in which 5 bits indicating an MCS of DCI fields uses BPSK, a specific position or bit field, e.g., a code point corresponding to 00000 or certain codepoints, may indicate the proposed method.

The proposed method (e.g., the third modulation scheme+transmission of M/2 symbols) may be indicated in combination with a high-layer signaling configuration. For example, only when the proposed method is configured by high-layer signaling, specific codepoints may be interpreted differently (e.g., interpreted as if the proposed method is indicated by specific codepoints). The base station may indicate the proposed method to the terminal by high-layer signaling as follows.

Simultaneously configure half transmission+$\pi/2$-BPSK by high-layer signaling

Simultaneously configure 3 dB power boosting+$\pi/2$-BPSK by high-layer signaling Configure $\pi/2$-BPSK in a PDSCH by high-layer signaling In this case, half transmission may indicate that only M/2 symbols are to be transmitted when M transmission resources are allocated as in the embodiments described above. Also, 3 dB power boosting may indicate that, when M transmission resources are allocated as in the embodiments described above, only M/2 symbols are transmitted and transmission is performed by increasing transmission power of the transmitted symbols by twice.

3. Method of linking to a modulation order of DCI: in this method, the base station indicates transmission (or reception) of symbols using the method (e.g., the third modulation scheme+M/2 symbols) proposed in the disclosure, by linking to a modulation order of DCI fields. For example, when the DCI field indicates BPSK modulation and the proposed method is configured by high-layer signaling, the terminal may determine that symbols are transmitted (or received) by using the method (e.g., the third modulation scheme+transmission of M/2 symbols) proposed in the disclosure, rather than BPSK. A high-layer signaling method may include the following methods.

Simultaneously configure half transmission+$\pi/2$-BPSK by high-layer signaling

Simultaneously configure 3 dB power boosting+$\pi/2$-BPSK by high-layer signaling Configure $\pi/2$-BPSK in a PDSCH by high-layer signaling 4. Method of linking to a DCI format: in this method, the base station indicates transmission of symbols using the method (e.g., the third modulation scheme+transmission of M/2 symbols) proposed in the disclosure, by using a new DCI field or a DCI field for fallback. The method proposed in the disclosure is useful when coverage of the terminal is insufficient. Accordingly, coverage of a control channel through which DCI is transmitted may be insufficient. In this case, a bit size of the DCI may be reduced to enhance the coverage of the terminal. In detail, when a new DCI format is defined, it may be assumed that the new DCI format is used only when only M/2 symbols among allocated M symbols are transmitted by using the method (e.g., the third modulation scheme+transmission of M/2 symbols) proposed in the disclosure. Because the new DCI format does not need a bit field indicating an MCS, the bit size of the DCI may be reduced by 5 bits, and thus, the coverage of the terminal may be enhanced.

5. Method of configuring a DCI format in advance by high-layer signaling: in this method, the method (e.g., the third modulation scheme+transmission of M/2 symbols) proposed in the disclosure is triggered by using a specific codepoint among all bit fields of DCI. That is, the above method is a method of designating and using a value of a certain codepoint indicating the method proposed in the disclosure by high-layer signaling. This method includes a method of using a DCI format differently by newly configuring a radio network temporary identifier (RNTI).

6. Method of implicitly identifying when a length of a scheduled allocation resource is shorter than a DFT size: in this method, when a size of an allocation resource is configured to be less than a size of a DFT used by the terminal or is scheduled to be less by DCI, the terminal determines by itself that transmission (or reception) is performed by using the method (e.g., the third modulation scheme+transmission of M/2 symbols) proposed in the disclosure, and applies a proposed reception (or transmission) operation. The proposed method is applicable when the number of symbols to be transmitted is less than M, it may be implicitly indicated through the DFT size and resource allocation (or scheduling). In the DFT size and resource allocation, at least one piece of information about a size of a resource may be included in the DCI.

An operating method of the transmission apparatus (base station or terminal) according to the first embodiment of the disclosure may be as follows. When the transmission apparatus transmits symbols (i.e., when the base station is the transmission apparatus), in transmission of M-size packets, the transmission apparatus may not use M/2 transmission resources among M allocated transmission resources and may use power available to transmit unused transmission resources, to transmit remaining M/2 transmission resources.

As a symbol mapping method for this purpose, the following four methods may be used. A zero symbol has an effect of increasing power but may also be used as a guard for a filter of the transmission apparatus. When a fourth method is used, there is no effect as a guard band, but a repetition effect occurs in a time symbol, and thus, a diversity effect may be obtained. In addition to the methods proposed below, a method of indicating an exact position, at which symbols are to be transmitted, by high-layer signaling may also be used.

M/2 zeros—M/2 modulated symbols

M/2 modulated symbols—M/2 zeros

M/4 zeros—M/2 modulated symbols—M/4 zeros mapping M/2 symbols to M resources with comb type An operating method of the reception apparatus (terminal or base station) according to the first embodiment of the disclosure may be as follows. If the reception apparatus determines that symbols are transmitted by using a transmission method (e.g., the third modulation scheme+transmission of M/2 symbols) proposed in the disclosure, the reception apparatus may identify that received symbols are half of the transmitted symbols, and may perform an operation to reconstruct the same.

For example, when the reception apparatus is the terminal, the terminal may be indicated that symbols are transmitted by the transmission method (e.g., the third modulation scheme+transmission of M/2 symbols) proposed in the disclosure through an indicator configured by DCI or high-layer signaling, and may perform an operation for receiving the symbols transmitted by the indicated method. Also, when the reception apparatus is the base station, the base station may indicate the terminal to transmit symbol by the transmission method (e.g., the third modulation scheme+transmission of M/2 symbols) proposed in the disclosure by DCI or high-layer signaling, and may perform an operation for receiving the symbols transmitted from the terminal by the indicated method.

The following three methods may be mainly used for an operation method of copying M/2 symbols received by the reception apparatus according to the transmission method proposed in the disclosure and transmitting M symbols as input to the IDFT.

- Method of inputting (configuring) symbols from a 0th reception symbol to a (M/2−1)-th reception symbol as symbols from a 0th symbol to a (M/2−1)-th symbol as the IDFT input, and inputting (configuring) the symbols from the 0th reception symbol to the (M/2−1)-th reception symbol as symbols from an M/2-th symbol to a (M−1)-th symbol as the IDFT input
- Method of inputting (configuring) symbols from a 0th reception symbol to a (M/2−1)-th reception symbol as symbols from an M/2-th symbol to a (M−1)-th symbol as the IDFT input, and inversely inputting (configuring) the symbols from the 0th reception symbol to the (M/2−1)-th reception symbol as symbols from a (M/2−1)-th symbol to a 0th symbol as the IDFT input
- Method of inputting (configuring) symbols from a 0th reception symbol to a (M/2−1)-th reception symbol as symbols from an M/4-th symbol to a (3M/4−1)-th symbol as the IDFT input, inversely inputting (configuring) symbols from the 0th reception symbol to a (M/4−1)-th reception symbol as symbols from a (M/4−1)-th reception symbol to a 0th symbol as the IDFT input, and inputting (configuring) symbols from an M/4-th reception symbol to a (M/2−1)-th reception symbol as symbols from a 3M/4-th symbol to a (M−1)-th symbol According to the first embodiment of the disclosure, power to be used for M/2 transmission resources among the M allocated transmission resources may be used to transmit M/2 transmission symbols, and thus, transmission power of the transmission symbols may increase by twice. Accordingly, a signal-to-noise ratio (SNR) per symbol may increase by 3 dB, and coverage of a corresponding channel may be enhanced.

Second Embodiment: In a Case where Only M Symbols are Transmitted while Scheduling 2M Modulated Symbols Hereinafter, operations of the base station and the terminal, according to the second embodiment of the disclosure, when transmission of the 2M modulated symbols is scheduled and only the M symbols are transmitted will be described. According to the proposed second embodiment, a method of performing transmission by applying the modulation schemes (i.e., the first to third modulation schemes) proposed in FIGS. 3A to 3C without changing existing DCI may be supported. The second embodiment may include the following methods.

1. In the first method, when it is configured by high-layer signaling to use the modulation scheme (i.e., the first modulation scheme, the second modulation scheme, or the third modulation scheme) proposed in FIGS. 3A to 3C and to transmit symbols on M resources among 2M allocated resources, the reception apparatus determines that 2M symbols are transmitted even though M symbols are transmitted on M resources. In this case, the reception apparatus assumes that a packet size (or code block size or a transport block size) actually used for transmission is twice a size identified by DCI. In this regard, for a high-layer signaling method, the high-layer signaling method described in the first embodiment may be applied.

2. In the second method, a DFT size is configured to 2M and M resources (e.g., resource elements) are allocated by high-layer signaling. In this case, the reception apparatus (terminal or base station) may determine that a packet size (or code block size or transport block size) actually used for transmission is twice a size indicated by DCI. In this regard, for a high-layer signaling method, the high-layer signaling method described in the first embodiment may be applied.

3. In the third method, when it is configured by high-layer signaling to use the modulation schemes (i.e., the first to third modulation schemes) proposed in FIGS. 3A to 3C, the reception apparatus operates under the assumption that 2× repetition coding is additionally applied between channel coding and modulation. In this case, the reception apparatus may operate under the assumption that a packet size actually used for transmission is the same as a size indicated by DCI. In this regard, for a high-layer signaling method, the high-layer signaling method described in the first embodiment may be applied.

According to the second embodiment of the disclosure, twice the packet size may be transmitted through M resources as in the related art, and thus, throughput may be enhanced by twice.

Third Embodiment: Reception Operation of Combining Two Symbols while Using the Method of the Related Art According to the third embodiment of the disclosure, M modulated symbols may be transmitted through M resources as in the related art. However, the transmission apparatus may transmit a constellation in a real axis or an imaginary axis by using the modulation schemes (i.e., the first to third modulation schemes) proposed in FIGS. 3A to 3C. In this case, the reception apparatus may receive two symbols having the same value among received M symbols. However, the two symbols having the same value have different noise values. A noise reduction effect may be obtained by using such a characteristic.

For example, in the method according to the third embodiment of the disclosure, the transmission apparatus transmits symbols by using only one of the real axis or the imaginary axis (i.e., by preventing symbols transmitted in the constellation from including both the real axis and the imaginary axis). In this case, the reception apparatus may receive the M symbols, and at least two symbols among the M reception symbols have the same value. If the symbols having the same value are s1 and s2, after channel estimation, reception signals may be y1=s1+n1 and y2=s1+n2. In this case, when y1 and y2 signals are configured as y3=(y1+y2)/2, y3=s1+(n1+n2)/2 is obtained. If noise is random, E[|y1|^2]=E[|y2|^2]<E[|y3|^2] is obtained, and thus, reconstruction performance may be enhanced. According to the third embodiment of the disclosure, a reception SNR is increased, which enhances coverage.

Fourth Embodiment: Operation Method Only when Reported as Terminal Capability

According to the fourth embodiment of the disclosure, the terminal capable of performing the reception operation according to the first to third embodiments of the disclosure described above may transmit information (capability information) indicating that the terminal has the capability to perform the reception operation with respect to the base station when accessing the base station. For the terminal capable of performing the corresponding reception operation, the base station may transmit data to the terminal by using the transmission method proposed in the disclosure.

Figure 6:
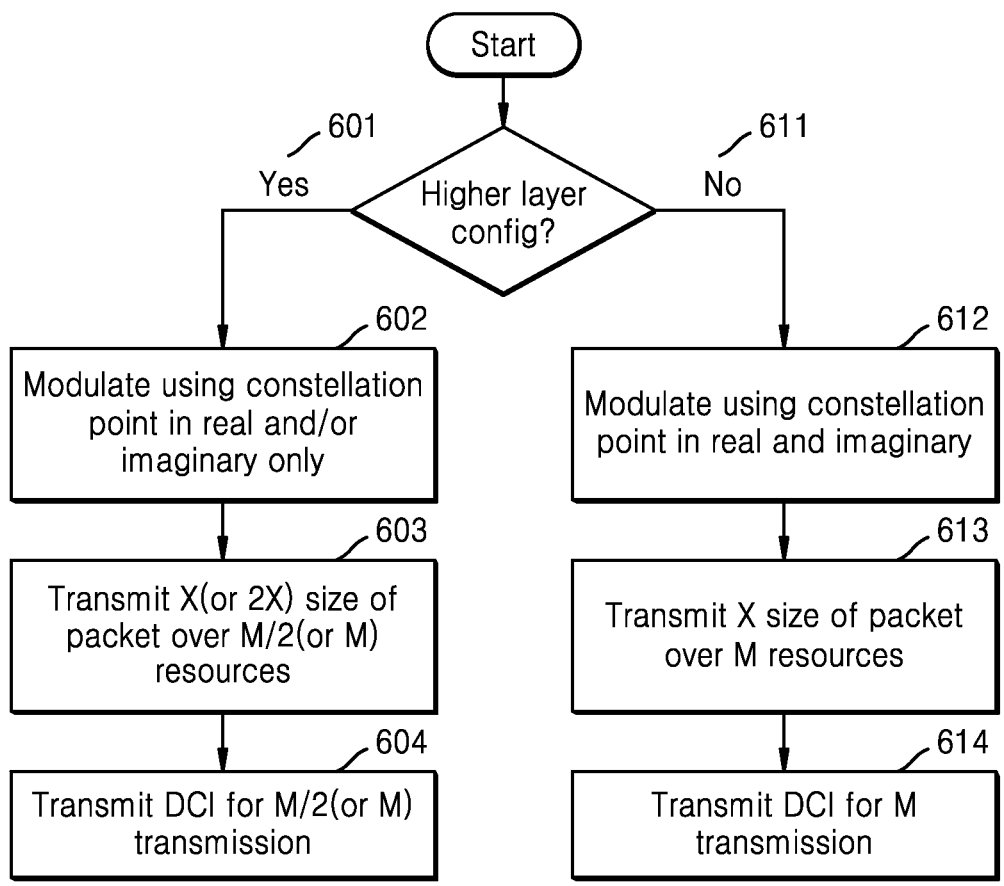
FIG. 6 is a flowchart illustrating a method by which a base station transmits data to a terminal according to a first embodiment or a second embodiment, according to an embodiment of the disclosure.

FIG. 6 is a flowchart of a method by which the base station transmits data to the terminal according to the first embodiment or the second embodiment, according to an embodiment of the disclosure.

According to an embodiment, referring to FIG. 6, it may be indicated by high-layer signaling to use the first modulation scheme, the second modulation scheme, or the third modulation scheme proposed in the disclosure and to use half of allocated resources (601).

In this case, the base station may modulate symbols by using only one of real constellation points or imaginary constellation points (602).

The base station may transmit half of the modulated symbols to the terminal through half of the allocated resources (603). For example, the modulated symbols may correspond to a packet of X (or 2X) size, and transmission resources may have a size of M (or 2M) corresponding to the packet of X (or 2X) size. In this case, the number of modulated symbols may be M (or 2M), and the base station may transmit M/2 (or M) symbols among the modulated symbols to the terminal through the transmission resources of M (or 2M) size.

The base station may transmit, to the terminal, DCI including information that the M/2 (or M) symbols are transmitted through resources of a half size (M/2 or M) among resources of M (or 2M) size allocated for transmission of M (or 2M) symbols (604). In this case, the DCI transmitted to the terminal may be the DCI described in the first embodiment and the second embodiment of the disclosure described above.

According to an embodiment, referring to FIG. 6, it may not be indicated by high-layer signaling to use the method (i.e., the first modulation scheme, the second modulation scheme, or the third modulation scheme) proposed in the disclosure and to use half of the allocated resources (611).

In this case, the base station may modulate the symbols by using both real constellation points or imaginary constellation points (612).

The base station may transmit the modulated symbols to the terminal through the allocated resources (613). For example, the modulated symbols may correspond to a packet of X size, and transmission resources may have a size of M corresponding to the packet of X size. Also, the number of modulated symbols may be M corresponding to the packet of X size.

The base station may transmit, to the terminal, DCI including information that the symbols are transmitted through allocated resources of M size (614).

Figure 7:
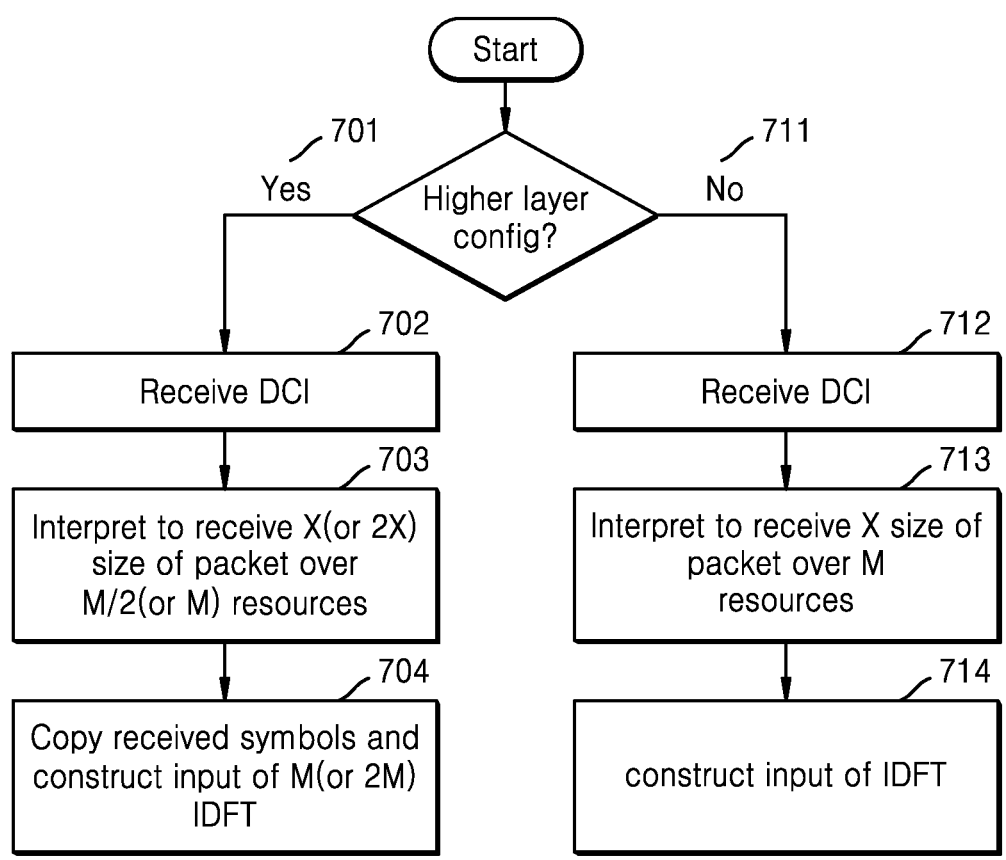
FIG. 7 is a flowchart illustrating a method by which a terminal receives data from a base station according to a first embodiment or a second embodiment, according to an embodiment of the disclosure.

FIG. 7 is a flowchart of a method by which the terminal receives data from the base station according to the first embodiment or the second embodiment, according to an embodiment of the disclosure.

According to an embodiment, referring to FIG. 7, it may be indicated by high-layer signaling to use the first modulation scheme, the second modulation scheme, or the third modulation scheme proposed in the disclosure and to use half of allocated resources (701).

The terminal may receive, from the base station, DCI including information that M/2 (or M) symbols are transmitted through resources of a half size (M/2 or M) among resources of M (or 2M) size allocated for transmission of M (or 2M) symbols (702). In this case, the DCI received by the terminal may be the DCI described in the first embodiment and the second embodiment of the disclosure described above.

The terminal may receive the M/2 (or M) symbols from the base station through transmission resources of M (or 2M) size. The terminal may determine that the M/2 (or M) symbols received from the base station are symbols for a packet of X (or 2X) size, based on the received DCI and/or high-layer signaling (703). That is, the terminal may determine that half of the M (or 2M) symbols corresponding to the packet of X (or 2X) size are received.

The terminal may configure M (or 2M) symbols as input to an IDFT of M (or 2M) size by copying the received M/2 (or M) symbols and may perform the IDFT (704).

According to an embodiment, referring to FIG. 7, it may not be indicated by high-layer signaling to use the method (i.e., the first modulation scheme, the second modulation scheme, or the third modulation scheme) proposed in the disclosure and to use half of the allocated resources (711).

The terminal may receive, from the base station, DCI including information that the symbols are transmitted through allocated resources of M size (712).

The terminal may receive the M symbols from the base station through the transmission resources of M size. The terminal may determine that the M symbols received from the base station are symbols for the packet of X size, based on the received DCI and/or high-layer signaling (713). That is, the terminal may determine that the M symbols corresponding to the packet of X size are received.

The terminal may configure the received M symbols as input to an IDFT of M size and may perform the IDFT (714).

Figure 8:
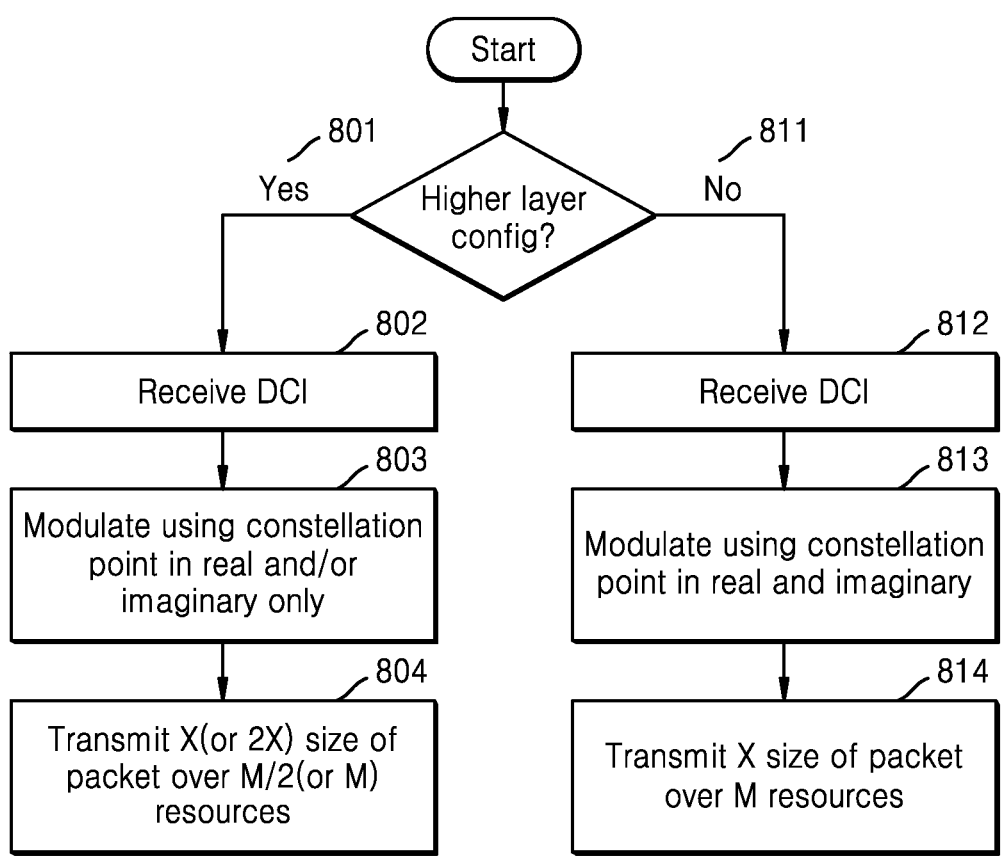
FIG. 8 is a flowchart illustrating a method by which a terminal transmits data to a terminal according to a first embodiment or a second embodiment, according to an embodiment of the disclosure.

FIG. 8 is a flowchart of a method by which the terminal transmits data to the terminal according to the first embodiment or the second embodiment, according to an embodiment of the disclosure.

According to an embodiment, referring to FIG. 8, it may be indicated by high-layer signaling to use the first modulation scheme, the second modulation scheme, or the third modulation scheme proposed in the disclosure and to use half of allocated resources (801).

The terminal may receive, from the base station, DCI including information indicating that M/2 (or M) symbols are to be transmitted through resources of a half size (M/2 or M) among resources of M (or 2M) size allocated for transmission of M (or 2M) symbols (802). In this case, the DCI received by the terminal may be the DCI described in the first embodiment and the second embodiment of the disclosure described above.

The terminal may modulate symbols by using only one of real constellation points or imaginary constellation points (803).

The terminal may transmit half of the modulated symbols to the base station through half of the allocated resources (804). For example, the modulated symbols may correspond to a packet of X (or 2X) size, and transmission resources may have a size of M (or 2M) corresponding to the packet of X (or 2X) size. In this case, the number of modulated symbols may be M (or 2M), and the terminal may transmit M/2 (or M) symbols among the modulated symbols to the base station through the transmission resources of M (or 2M) size.

According to an embodiment, referring to FIG. 8, it may not be indicated by high-layer signaling to use the method (i.e., the first modulation scheme, the second modulation scheme, or the third modulation scheme) proposed in the disclosure and to use half of the allocated resources (811).

The terminal may receive, from the base station, DCI including information indicating that the symbols are to be transmitted through allocated resources of M size (812).

The terminal may modulate symbols by using both real constellation points and imaginary constellation points (813).

The terminal may transmit the modulated symbols to the base station through the allocated resources (613). For example, the modulated symbols may correspond to a packet of X size, and transmission resources may have a size of M corresponding to the packet of X size. Also, the number of modulated symbols may be M corresponding to the packet of X size.

Figure 9:
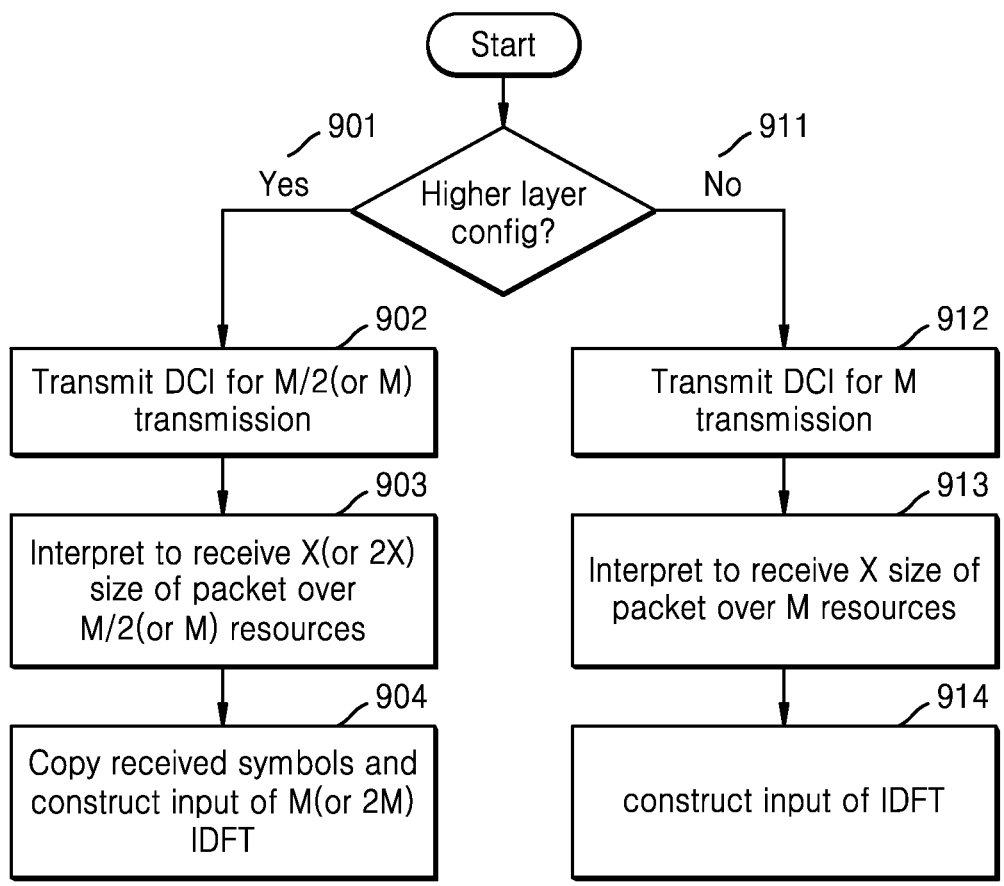
FIG. 9 is a flowchart illustrating a method by which a base station receives data from a base station according to a first embodiment or a second embodiment, according to an embodiment of the disclosure.

FIG. 9 is a flowchart of a method by which the base station receives data from the base station according to the first embodiment or the second embodiment, according to an embodiment of the disclosure.

According to an embodiment, referring to FIG. 9, it may be indicated by high-layer signaling to use the first modulation scheme, the second modulation scheme, or the third modulation scheme proposed in the disclosure and to use half of allocated resources (901).

The base station may transmit, to the terminal, DCI including information indicating that the M/2 (or M) symbols are to be transmitted through resources of a half size (M/2 or M) among resources of M (or 2M) size allocated for transmission of M (or 2M) symbols (902). In this case, the DCI transmitted to the terminal may be the DCI described in the first embodiment and the second embodiment of the disclosure described above.

The base station may receive the M/2 (or M) symbols from the terminal through transmission resources of M (or 2M) size. The base station may determine that the M/2 (or M) symbols received from the terminal are symbols for a packet of X (or 2X) size, based on the DCI and/or high-layer signaling transmitted to the terminal (903). That is, the base station may determine that half of the M (or 2M) symbols corresponding to the packet of X (or 2X) size are received.

The base station may configure M (or 2M) symbols as input to an IDFT of M (or 2M) size by copying the received M/2 (or M) symbols and may perform the IDFT (904).

According to an embodiment, referring to FIG. 9, it may not be indicated by high-layer signaling to use the method (i.e., the first modulation scheme, the second modulation scheme, or the third modulation scheme) proposed in the disclosure and to use half of the allocated resources (911).

The base station may transmit, to the terminal, DCI including information indicating that the symbols are to be transmitted through allocated resources of M size (912).

The base station may receive the M symbols from the terminal through the transmission resources of M size. The base station may determine that the M symbols received from the base station are symbols for the packet of X size, based on the received DCI and/or high-layer signaling (913). That is, the terminal may determine that the M symbols corresponding to the packet of X size are received.

The base station may configure the received M symbols as input to an IDFT of M size and may perform the IDFT (914).

Figure 10:
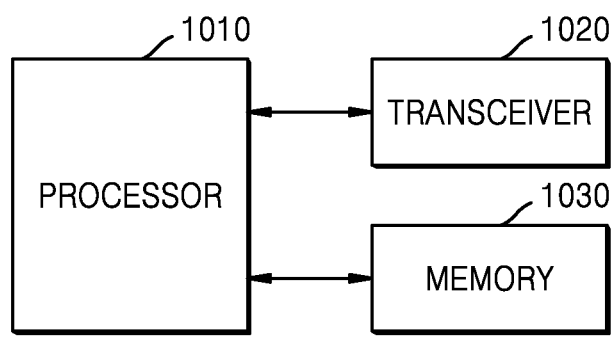
FIG. 10 is a block diagram of a structure of a transmission apparatus, according to an embodiment of the disclosure.

FIG. 10 is a block diagram of a structure of the transmission apparatus, according to an embodiment of the disclosure. According to an embodiment, the transmission apparatus may be the base station or the terminal.

Referring to FIG. 10, the transmission apparatus according to the disclosure may include a processor 1010, a transceiver 1020, and a memory 1030. However, components of the transmission apparatus are not limited thereto. For example, the transmission apparatus may include more components than the aforementioned components or may include fewer components than the aforementioned components. In addition, the processor 1010, the transceiver 1020, and the memory 1030 may be implemented in a single chip.

According to an embodiment, the processor 1010 may control a series of processes for the transmission apparatus to operate according to the embodiments of the disclosure described above. For example, the processor 1010 may control the components of the transmission apparatus to perform a method of transmitting uplink control information on a plurality of uplink channels, according to an embodiment of the disclosure. The processor 1010 may include a plurality of processors and may perform an operation according to the embodiments of the disclosure described above, by executing a program stored in the memory 1030.

The transceiver 1020 may transmit and receive signals to and from the base station. The signals transmitted to and received from the base station may include control information and data. The transceiver 1020 may include an RF transmitter for up-converting a frequency of a signal to be transmitted and amplifying the signal and an RF receiver for low-noise amplifying a received signal and down-converting a frequency of the received signal. However, this is merely an embodiment of the transceiver 1020, and components of the transceiver 1020 are not limited to the RF transmitter and the RF receiver. Also, the transceiver 1020 may receive a signal through a radio channel and output a signal to the processor 1010 and may transmit a signal output from the processor 1010 through a radio channel.

According to an embodiment, the memory 1030 may store a program and data necessary for operations of the transmission apparatus. Also, the memory 1030 may store control information or data included in signals transmitted and received by the transmission apparatus. The memory 1030 may include a storage medium such as read-only memory (ROM), random access memory (RAM), a hard disc, a compact disc (CD)-ROM, and a digital versatile disc (DVDs), or a combination of storage media. Also, the memory 1030 may include a plurality of memories. According to an embodiment, the memory 1030 may store a program for performing an operation according to the embodiments of the disclosure described above.

Figure 11:
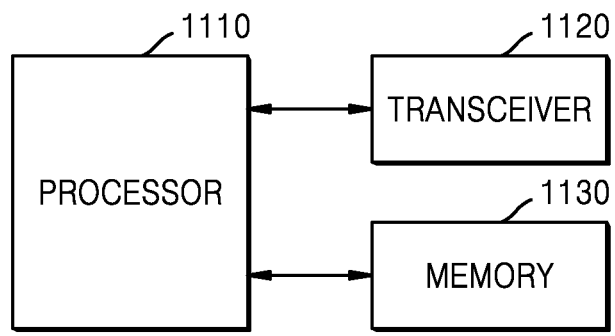
FIG. 11 is a block diagram of a structure of a reception apparatus, according to an embodiment of the disclosure.

FIG. 11 is a block diagram of a structure of the reception apparatus, according to an embodiment of the disclosure. According to an embodiment, the reception apparatus may be the base station or the terminal.

Referring to FIG. 11, the reception apparatus according to the disclosure may include a processor 1110, a transceiver 1120, and a memory 1130. However, components of the reception apparatus are not limited thereto. For example, the reception apparatus may include more components than the aforementioned components or may include fewer components than the aforementioned components. In addition, the processor 1110, the transceiver 1120, and the memory 1130 may be implemented in a single chip.

According to an embodiment, the processor 1110 may control a series of processes for the reception apparatus to operate according to the embodiments of the disclosure described above. For example, the processor 1110 may control the components of the reception apparatus to perform a method of transmitting uplink control information on a plurality of uplink channels, according to an embodiment of the disclosure. The processor 1110 may include a plurality of processors and may perform an operation according to the embodiments of the disclosure described above, by executing a program stored in the memory 1130.

The transceiver 1120 may transmit and receive signals to and from the reception apparatus. The signals transmitted to and received from the reception apparatus may include control information and data. The transceiver 1120 may include an RF transmitter for up-converting a frequency of a signal to be transmitted and amplifying the signal and an RF receiver for low-noise amplifying a received signal and down-converting a frequency of the received signal. However, this is merely an embodiment of the transceiver 1120, and components of the transceiver 1120 are not limited to the RF transmitter and the RF receiver. Also, the transceiver 1120 may receive a signal through a radio channel and output a signal to the processor 1110 and may transmit a signal output from the processor 1110 through a radio channel.

According to an embodiment, the memory 1130 may store a program and data necessary for operations of the reception apparatus. Also, the memory 1130 may store control information or data included in signals transmitted and received by the reception apparatus. The memory 1130 may include a storage medium such as ROM, RAM, a hard disc, a CD-ROM, and a DVD, or a combination of storage media. Also, the memory 1130 may include a plurality of memories. According to an embodiment, the memory 1130 may store a program for performing an operation according to the embodiments of the disclosure described above.

Meanwhile, the embodiments of the disclosure described with reference to the present specification and the drawings are merely illustrative of specific examples to easily facilitate description and understanding of the disclosure and are not intended to limit the scope of the disclosure. That is, it will be apparent to those of ordinary skill in the art that the disclosure is not limited to the embodiments of the disclosure, which have been provided only for illustrative purposes. Also, the embodiments may be combined to be implemented, when required. For example, parts of the embodiments of the disclosure may be combined to operate the base station and the terminal. Also, although a new radio (NR) system is described in the above embodiments, other modifications based on the technical scope of the embodiments may be made, and embodiments of the disclosure may also be applied to other systems such as frequency-division duplexing (FDD) or time-division duplexing (TDD) long-term evolution (LTE) systems.

While embodiments of the disclosure are disclosed and particular terms are used throughout the specification and drawings, they are merely used in a general sense to provide easy descriptions and help understanding of the disclosure and are not intended to limit the scope of the disclosure. Thus, it will be apparent to those of ordinary skill in the art that the disclosure is not limited to the embodiments described, which have been provided only for illustrative purposes.

The invention claimed is:

1. A method, performed by a transmission apparatus, of transmitting data in a wireless communication system, the method comprising:
   performing $\pi/2$-binary phase shift keying (BPSK) modulation on M symbols;
   performing a discrete Fourier transform (DFT) on the M symbols on which the $\pi/2$-BPSK modulation has been performed;
   identifying M/2 symbols among the M symbols on which the DFT has been performed, wherein the M symbols on which the DFT has been performed are symmetric and information of the identified M/2 symbols is same with information of remaining M/2 symbols among the M symbols on which the DFT has been performed; wherein M is an integer greater than or equal to 1;
   performing an inverse fast Fourier transform (IFFT) on the M/2 symbols identified among the M symbols on which the DFT has been performed; and
   transmitting, to a reception apparatus, the M/2 symbols on which the IFFT has been performed,
   wherein a constellation of the M symbols on which the $\pi/2$-BPSK modulation has been performed has only real components or imaginary components.

2. The method of claim 1, wherein the M/2 symbols are transmitted by using transmission power for transmitting the M symbols.

3. The method of claim 1,
   wherein the transmission apparatus is a base station and the reception apparatus is a terminal,
   wherein the method further comprises transmitting downlink control information (DCI) to the terminal, and
   wherein the DCI comprises information that the $\pi/2$-BPSK modulation is performed on symbols and half of the symbols on which the $\pi/2$-BPSK modulation has been performed are transmitted to the terminal.

4. The method of claim 1,
   wherein the transmission apparatus is a terminal and the reception apparatus is a base station,
   wherein the method further comprises receiving DCI from the base station, and
   wherein the DCI comprises information indicating that the $\pi/2$-BPSK modulation is to be performed on symbols and half of the symbols on which the $\pi/2$-BPSK modulation has been performed are to be transmitted to the base station.

5. A method, performed by a reception apparatus, of receiving data in a wireless communication system, the method comprising:
   receiving M/2 symbols from a transmission apparatus;
   performing a fast Fourier transform (FFT) on the M/2 symbols;
   obtaining M symbols including the M/2 symbols on which the FFT has been performed, and M/2 symbols obtained by copying the M/2 symbols on which the FFT has been performed, wherein the M symbols are symmetric and information of the M/2 symbols on which the FFT has been performed is same with information of copied M/2 symbols; wherein M is an integer greater than equal to 1; and performing an inverse discrete Fourier transform (IDFT) on the M symbols;

wherein the M/2 symbols received from the transmission apparatus are symbols on which π/2-binary phase shift keying (BPSK) modulation has been performed at the transmission apparatus, and wherein a constellation of the M/2 symbols on which the FFT has been performed has only real components or imaginary components according to the π/2-BPSK modulation.

6. The method of claim 5, wherein the M/2 symbols received from the transmission apparatus are transmitted by using transmission power for transmitting the M symbols.

7. The method of claim 5, wherein the reception apparatus is a terminal and the transmission apparatus is a base station, wherein the method further comprises receiving downlink control information (DCI) from the base station, and wherein the DCI comprises information that the π/2-BPSK modulation is performed on symbols and half of the symbols on which the π/2-BPSK modulation has been performed are transmitted to the terminal.

8. The method of claim 5, wherein the reception apparatus is a base station and the transmission apparatus is a terminal, wherein the method further comprises transmitting DCI to the terminal, and wherein the DCI comprises information indicating that the π/2-BPSK modulation is to be performed on symbols and half of the symbols on which the π/2-BPSK modulation has been performed are to be transmitted to the base station.

9. A transmission apparatus for transmitting data in a wireless communication system, the transmission apparatus comprising:

a transceiver; and at least one processor connected to the transceiver and configured to:

perform π/2-binary phase shift keying (BPSK) modulation on M symbols, perform a discrete Fourier transform (DFT) on the M symbols on which the π/2-BPSK modulation has been performed, wherein M is integer greater than or equal to 1, identify M/2 symbols among the M symbols on which the DFT has been performed, wherein the M symbols on which the DFT has been performed are symmetric and information of the identified M/2 symbols is same with information of remaining M/2 symbols among the M symbols on which the DFT has been performed, perform an inverse fast Fourier transform (IFFT) on the M/2 symbols identified among the M symbols on which the DFT has been performed, and transmit, to a reception apparatus, the M/2 symbols on which the IFFT has been performed, wherein a constellation of the M symbols on which the π/2-BPSK modulation has been performed has only real components or imaginary components.

10. The transmission apparatus of claim 9, wherein the M/2 symbols are transmitted by using transmission power for transmitting the M symbols.

11. The transmission apparatus of claim 9, wherein the transmission apparatus is a base station and the reception apparatus is a terminal, wherein the at least one processor is configured to:

transmit downlink control information (DCI) to the terminal, and wherein the DCI comprises information that the π/2-BPSK modulation is performed on symbols and half of the symbols on which the π/2-BPSK modulation has been performed are transmitted to the terminal.

12. The transmission apparatus of claim 9, wherein the transmission apparatus is a terminal and the reception apparatus is a base station, wherein the at least one processor is configured to:

receive DCI from the base station, and wherein the DCI comprises information indicating that the π/2-BPSK modulation is to be performed on symbols and half of the symbols on which the π/2-BPSK modulation has been performed are to be transmitted to the base station.

13. A reception apparatus for receiving data in a wireless communication system, the reception apparatus comprising:

a transceiver; and at least one processor connected to the transceiver and configured to:

receive M/2 symbols from a transmission apparatus, wherein M is an integer greater than or equal to 1, perform a fast Fourier transform (FFT) on the M/2 symbols, and obtain M symbols including the M/2 symbols on which the FFT has been performed, and M/2 symbols obtained by copying the M/2 symbols on which the FFT has been performed, wherein the M symbols are symmetric and information of the M/2 symbols on which the FFT has been performed is same with information of copied M/2 symbols, and perform an inverse discrete Fourier transform (IDFT) on the M symbols, wherein the M/2 symbols received from the transmission apparatus are symbols on which π/2-binary phase shift keying (BPSK) modulation has been performed by the transmission apparatus, and wherein a constellation of the M/2 symbols on which the FFT has been performed has only real components or imaginary components according to the π/2-BPSK modulation.

14. The reception apparatus of claim 13, wherein the M/2 symbols received from the transmission apparatus are transmitted by using transmission power for transmitting the M symbols.

15. The reception apparatus of claim 13, wherein the reception apparatus is a terminal and the transmission apparatus is a base station, wherein the at least one processor is configured to:

receive downlink control information (DCI) from the base station, and wherein the DCI comprises information that the π/2-BPSK modulation is performed on symbols and half of the symbols on which the π/2-BPSK modulation has been performed are transmitted to the terminal.

* * * * *